United States Patent [19]

Orvis

[11] 4,336,954
[45] Jun. 29, 1982

[54] TRACTOR TRAILER HITCH

[76] Inventor: Victor R. Orvis, 1250 N. Ralston, Anaheim, Calif. 92801

[21] Appl. No.: 113,460

[22] Filed: Jan. 21, 1980

[51] Int. Cl.³ .............................................. B60D 1/00
[52] U.S. Cl. ................................ 280/415 R; 172/248; 172/439; 280/461 A
[58] Field of Search .......... 280/415 R, 415 A, 456 A, 280/460 A, 461 A; 172/248, 439

[56] References Cited

U.S. PATENT DOCUMENTS

| | | | |
|---|---|---|---|
| 3,031,208 | 4/1962 | Abbott | 280/415 A |
| 3,338,594 | 8/1967 | Schuler | 280/415 A |
| 3,837,674 | 9/1974 | Rathsack | 280/415 A |
| 4,199,167 | 4/1980 | Points | 280/415 A |

FOREIGN PATENT DOCUMENTS 226452  9/1958  Australia ............................ 280/461

*Primary Examiner*—John A. Pekar
*Attorney, Agent, or Firm*—Donald W. Canady

[57] ABSTRACT

An improved hitch for attaching a trailer to a farm type tractor is disclosed, with a means for supporting the hitch at the distal end thereof by attachment to a support member provided on the tractor for implement support.

7 Claims, 3 Drawing Figures

TRACTOR TRAILER HITCH

FIELD OF THE INVENTION

The field of art to which the invention pertains is vehicle accessories, tractor towing equipment, trailer accessories including tow hitches.

BACKGROUND OF THE INVENTION

Tractors are customarily used with a variety of implements to perform the many functions for which tractors are utilized for farming, mowing, landscaping, construction, or the like. The size of a tractor determines the range of tractor functions, however, all tractors are equipped for use with implements. Commonly used tractor implements are the plow, rotary tiller, cultivator and disc harrow for farming and a rear blade, mower, box scraper, post hole digger, front loader and front blade for construction and landscaping. A three point hitch is essential with many of these implements which require adjustability or a lifting capability.

Tractors are also used to tow trailers, wagons and other equipment, however, such towing is not normally done with the three-point hitch used for the above mentioned implements. On the other hand, the conventional trailer hitch is not practical for some tractors since the large rear tires of the conventional tractor severely limit the turning radius of the tractor towed trailer. Merely extending the connector point of the conventional hitch rearwardly sufficient to clear the tractor rear wheels has not been satisfactory, since the stability and strength of such an elongated hitch is inadequate.

SUMMARY OF THE INVENTION

It is a principal object of my present invention to provide a trailer hitch for a tractor which hitch is compatible with a three point tractor implement hitch. Another object of my invention is to provide a means for supporting a tractor trailer hitch with a brace. The objects of my invention are accomplished primarily by providing a trailer hitch which extends rearwardly of the tractor sufficiently to permit turning, and has means proximate the distal end of said hitch for detachably connecting the distal end of an implement support brace or member to the hitch to provide the support and stability necessary to tow the trailer with the tractor.

Other objects and a more complete understanding of my present invention will become apparent from the enclosed drawings, wherein:

DESCRIPTION OF THE PREFERRED EMBODIMENT OF THE INVENTION

Figure 1:
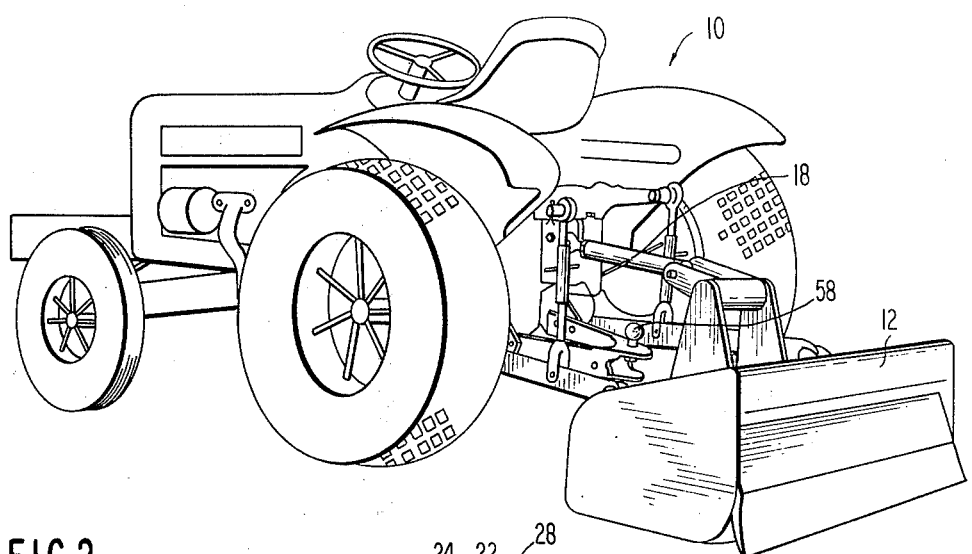
FIG. 1 shows a tractor connected to an implement with a conventional three-point hitch.
Figure 2:
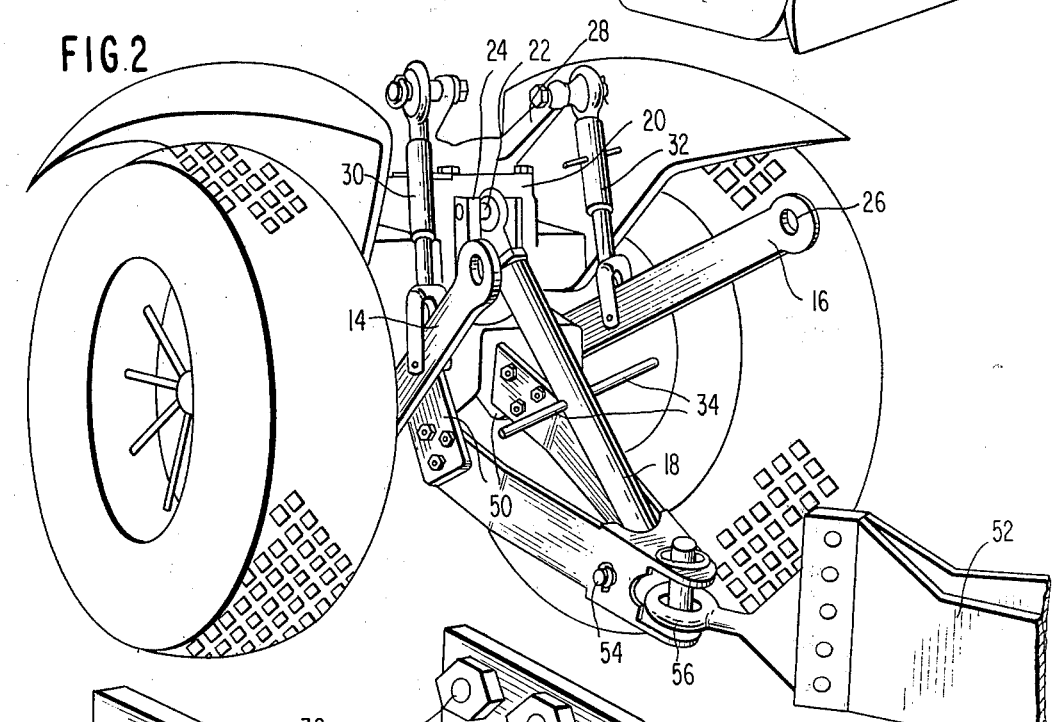
FIG. 2 shows a trailer hitch in accordance with the present invention attached to a pintle hook trailer connector.

Tractor 10 is a conventional tractor used for farm, garden, lawn, and construction yard applications. As used herein "tractor" means a farm-construction type tractor as shown in FIG. 1, as distinguished from a truck-tractor. Tractor as shown in FIGS. 1 and 2, is equipped with a three-point implement hitch for operative attachment to one of the several implements commonly employed with such general application tractors, i.e. bottom plows, rotary tillers, cultivators, disc harrows, rear-mounted mowers, back hoes, box scrapers, or the like. In FIG. 1 a box scraper 12 is shown attached to tractor 10 with the so-called three-point implement hitch provided on tractor 10. As best shown in FIG. 2, the three point hitch comprises the lift arms 14 and 16 and adjuster 18 which is pivotally mounted to the tractor frame 20 on pivot line 22 which is supported on frame 20 by pivot 2 pin mount 24. The distal ends of the lift arms 14 and 16 and the adjuster 18 are provided with pin connectors 26 for attachment to the tractor implement 12.

The lift arms 14 and 16 of the three point hitch or connector are typically equipped for hydraulical positioning and manipulation of the implement with an hydraulic lift arm 28 through turn buckles 30 and 32 which provide adjustable linkage between hydraulic lift arm 28 and lift arms 14 and 16. Adjuster 18 is provided with turn-buckle adjustability, by circumferential rotation of the outer sleeve to which turn handles 34 are affixed. Thus the length of adjuster 18 may be varied to permit attachment to different implements and to the trailer tow hitch 36 as will be described hereinafter.

Figure 3:
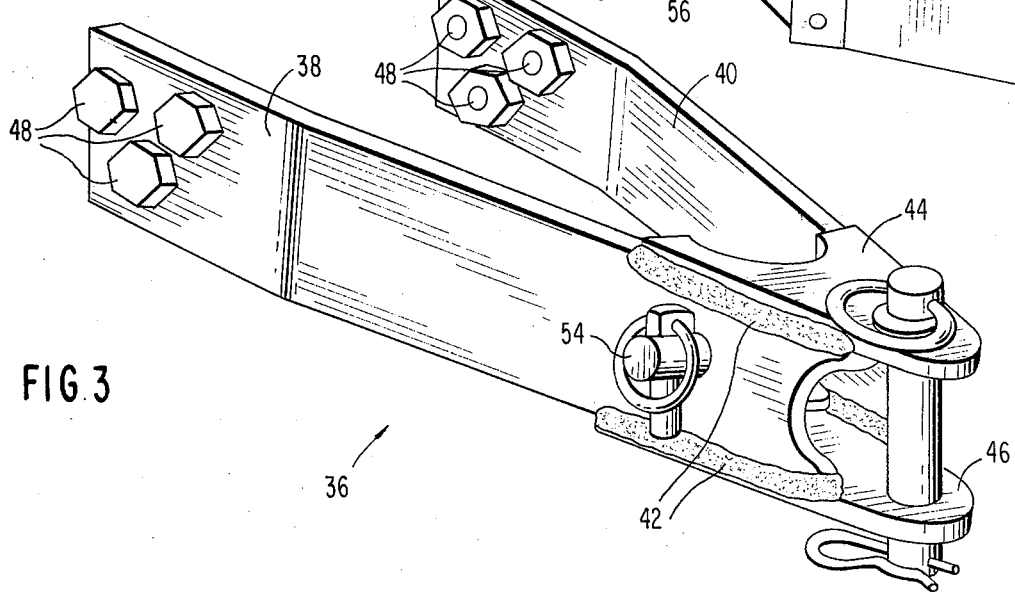
FIG. 3 is an enlarged view of a trailer hitch shown in FIG. 2.

The trailer hitch 36 as best shown in FIG. 3, is constructed of side arms 38 and 40 affixed as with welds 42 to top and bottom gussets 44 and 46. Mounting bolts 48 are provided for attaching trailer hitch 36 to the tractor frame 20 through brackets 50 which are affixed integrally to frame 20. The length of the hitch side arms 38 and 40 must be sufficient to position the hitch trailer connector means rearwardly of the tractor far enough to permit a workable turning radius of the tractor 10 when towing a trailer 52.

The hitch 36 has a releasable means for connecting the distal end of adjuster 18 proximate the trailer connection point of the hitch, so that with the adjuster so connected (as depicted in FIG. 2), the adjuster provides a support brace for stabilizing the hitch 36 as the tractor tows the trailer 52. A removable pin connector (pull pin) 54 is shown for releasably affixing the adjuster 18 to the distal end of the hitch, although a hook fastener or other means may be employed. The trailer connector may be either a pintle hood-pin connector 56 as shown in FIG. 2 or the tow hitch may be equipped with a tow ball connector 58 as shown in FIG. 1, to which a trailer with a conventional tow ball hitch may be connected. It should be noted that where the tractor is connected to an implement such as box scraper 12, the tow hitch 36 of my present invention is inoperative, as shown in FIG. 1, however, with the tractor rigged for towing a trailer 52 as shown in FIG. 2, the lift arms of the three point implement connector are positional to clear the trailer 52 and the third point of the three point connector, i.e. the adjuster 18, is operably affixed to the hitch as shown in FIG. 2 and described above.

The hitch of my present invention may also be employed with tractors which are not equipped with a three point implement connector, however, a center brace, e.g. adjuster 18 must be provided for such a tractor rig.

Although my invention has been described herein in reference to the preferred embodiment shown in the drawings, with a certain degree of particularity, it is to be understood that my invention should not be limited to the details thereof, but should afford the full scope of the following claims.

I claim as my invention:

1. A trailer hitch for a tractor integrally equipped with an implement hitch and having an implement center support member pivotally attached to said tractor and extending outwardly from said tractor for attachment to said implement, comprising:
    (a) said trailer hitch being rigidly secured to the frame of said tractor and extending rearwardly between spaced-apart lift arms of said implement hitch,
    (b) said hitch including a distal end portion having trailer-connecting means which terminate forwardly of the rear ends of said lift arms to thereby avoid interference with an implement when connected to said implement lift arms, and
    (c) means for connecting the outwardly extending end of said center support member to the distal end of said trailer hitch to brace said trailer hitch to said tractor for pulling said trailer.

2. The trailer hitch of claim 1 wherein said trailer connecting means includes a removable pin for connecting said hitch to a pintle hood connector on said trailer.

3. The trailer hitch of claim 1 wherein said trailer connecting means includes a trailer ball on the distal end of said hitch for attachment to said trailer.

4. The trailer hitch of claim 1 wherein a pin is removably connected to the distal end of said hitch for attaching said support member to said hitch.

5. The trailer hitch of claim 1 wherein said trailer connecting means are sufficiently rearward of said tractor to permit turning of the tractor when said trailer is connected thereto.

6. The trailer hitch of claim 1 wherein said outwardly extending end of said support member attaches to said hitch proximate said trailer connecting means.

7. A trailer hitch for a tractor equipped with a three-point implement hitch for attaching an implement to said tractor which implement hitch attaches to said implement at said three-point hitch which consists of two spaced-apart lift arms and a center support member pivotally attached to said tractor and extending outwardly from said tractor, comprising:
    (a) means for rigidly attaching said trailer hitch to said tractor, said trailer hitch extending rearwardly between said lift arms of said three-point hitch,
    (b) means for detachably connecting a trailer to the distal end of said trailer hitch, said trailer connecting means of said hitch terminating forwardly of the rear ends of said lift arms,
    (c) means for connecting the outwardly extending end of said center support member to the distal end of said trailer hitch to brace said trailer hitch to said tractor for pulling said trailer, and
    (d) the distal end of said trailer hitch being sufficiently rearward of said tractor to permit turning of the tractor when said trailer is connected thereto.

* * * * *